US012683480B2

(12) United States Patent
Paul et al.

(10) Patent No.: US 12,683,480 B2
(45) Date of Patent: Jul. 14, 2026

(54) TANK CAPACITOR CHARGING FOR PULSED LOAD APPLICATIONS

(71) Applicant: Apple Inc., Cupertino, CA (US)

(72) Inventors: Rajarshi Paul, Los Gatos, CA (US);
Parin Patel, Monte Sereno, CA (US);
Daniel P Kumar, Fremont, CA (US);
Jason M Rau, Campbell, CA (US)

(73) Assignee: Apple Inc., Cupertino, CA (US)

( * ) Notice: Subject to any disclaimer, the term of this
patent is extended or adjusted under 35
U.S.C. 154(b) by 333 days.

(21) Appl. No.: 18/477,726

(22) Filed: Sep. 29, 2023

(65) Prior Publication Data

US 2025/0112550 A1     Apr. 3, 2025

(51) Int. Cl.
H02M 1/00      (2007.01)
H02M 3/155     (2006.01)
H02M 3/158     (2006.01)

(52) U.S. Cl.
CPC ........... H02M 1/007 (2021.05); H02M 3/158
(2013.01); H02M 3/155 (2013.01)

(58) Field of Classification Search
CPC ....... H02M 1/007; H02M 3/155; H02M 3/158
See application file for complete search history.

(56) References Cited

U.S. PATENT DOCUMENTS

| | | | |
|---|---|---|---|
| 6,462,507 B2 * | 10/2002 | Fisher, Jr. ................. | H02J 7/35 |
| | | | 307/66 |
| 7,656,141 B1 | 2/2010 | Granat | |
| 8,766,606 B2 | 7/2014 | Batikoff et al. | |
| 10,673,327 B2 * | 6/2020 | Mondal ................. | H02M 1/083 |
| 11,191,142 B2 | 11/2021 | Rothschild et al. | |
| 11,557,910 B2 | 1/2023 | van Sinderen et al. | |
| 2012/0286691 A1 | 11/2012 | Jesme | |
| 2016/0105098 A1 * | 4/2016 | Savulak .................. | H02J 7/345 |
| | | | 323/234 |
| 2022/0052597 A1 * | 2/2022 | Yao ........................ | H02M 1/088 |

* cited by examiner

*Primary Examiner* — Jue Zhang
(74) *Attorney, Agent, or Firm* — FLETCHER YODER PC

(57) ABSTRACT

A power system for powering a pulsed load that intermittently delivers current pulses can include: an energy reservoir; a first DC-DC converter having an input that receives an input voltage and an output coupled to the energy reservoir; a second DC-DC converter having an input coupled to the energy reservoir and an output couplable to the pulsed load; and control circuitry that operates the first DC-DC converter to charge the energy reservoir from a minimum or valley voltage to a maximum or peak voltage during a charging window just prior to a current pulse of the pulsed load so that the first DC-DC converter is at or near its maximum output current at a beginning of the current pulse of the pulsed load.

20 Claims, 4 Drawing Sheets

TANK CAPACITOR CHARGING FOR PULSED LOAD APPLICATIONS

BACKGROUND

Electronic devices may include power systems that need to power intermittent pulsed loads. To achieve this, such power systems may include an energy storage reservoir, such as a tank capacitor and various converter circuitry to selectively charge and discharge the energy storage reservoir to meet the power requirements of the intermittent pulsed load without imposing too large an instantaneous power requirement on a power source of the electronic device. Such systems implemented heretofore may suffer from sub-optimal configurations.

SUMMARY

Disclosed herein are power systems for electronic devices that power intermittent pulsed loads that address various deficiencies of prior art systems.

An electronic device power system that powers a pulsed load that intermittently delivers current pulses can include: a tank capacitor for storing energy to deliver the current pulses of the pulsed load; a boost converter having an input that receives an input voltage and an output coupled to the energy reservoir; an additional converter having an input coupled to the energy reservoir and an output couplable to the pulsed load; and control circuitry that operates the boost converter to charge the tank capacitor from a minimum or valley voltage to a maximum or peak voltage during a charging window just prior to a current pulse of the pulsed load so that the boost converter is at or near its maximum output current at a beginning of the current pulse of the pulsed load. The control circuitry can include: circuitry responsive to a strobe signal indicating a timing of the current pulse and a control error signal to generate drive signals for one or more switching devices of the first DC-DC converter; circuitry responsive to one or more additional signals to alter timing of the charging window; and circuitry responsive to one or more additional signals to modulate a setpoint of the maximum or peak voltage of the energy reservoir responsive to the maximum or peak voltage.

The circuitry responsive to one or more additional signals to alter timing of the charging window can include circuitry that monitors the minimum or valley voltage of the energy reservoir and increases or decreases the length of the charging window in response thereto. The circuitry that monitors the minimum or valley voltage of the energy reservoir and increases or decreases the length of the charging window in response thereto can include a hysteretic comparator. The circuitry responsive to one or more additional signals to modulate a setpoint of the maximum or peak voltage of the energy reservoir responsive to the maximum or peak voltage can include a hysteretic comparator. The circuitry responsive to one or more additional signals to modulate a setpoint of the maximum or peak voltage of the energy reservoir responsive to the maximum or peak voltage can include a linear feedback shift register.

A controller for a power system that powers a pulsed load that intermittently delivers current pulses can include control circuitry configured to operate a DC-DC converter to charge an energy reservoir from a minimum or valley voltage to a maximum or peak voltage during a charging window just prior to a current pulse of the pulsed load so that the DC-DC converter is at or near its maximum output current at a beginning of the current pulse of the pulsed load. The control circuitry can further include circuitry responsive to a strobe signal indicating a timing of the current pulse and a control error signal to generate drive signals for one or more switching devices of the DC-DC converter. The energy reservoir can be a tank capacitor, and the DC-DC converter can be a boost converter.

The controller can further include circuitry responsive to one or more additional signals to alter timing of the charging window. The circuitry responsive to one or more additional signals to alter timing of the charging window can include circuitry that monitors the minimum or valley voltage of the energy reservoir and increases or decreases the length of the timing window in response thereto. The controller can further include circuitry responsive to one or more additional signals to modulate a setpoint of the maximum or peak voltage of the energy reservoir responsive to the maximum or peak voltage.

A power system for powering a pulsed load that intermittently delivers current pulses can include: an energy reservoir; a first DC-DC converter having an input that receives an input voltage and an output coupled to the energy reservoir; a second DC-DC converter having an input coupled to the energy reservoir and an output couplable to the pulsed load; and control circuitry that operates the first DC-DC converter to charge the energy reservoir from a minimum or valley voltage to a maximum or peak voltage during a charging window just prior to a current pulse of the pulsed load so that the first DC-DC converter is at or near its maximum output current at a beginning of the current pulse of the pulsed load. The energy reservoir can be a tank capacitor, the first DC-DC converter can be a boost converter, and the second DC-DC converter can be a buck converter. The control circuitry can further include circuitry responsive to a strobe signal indicating a timing of the current pulse and a control error signal to generate drive signals for one or more switching devices of the first DC-DC converter.

The power system can further include circuitry responsive to one or more additional signals to alter timing of the charging window. The circuitry responsive to one or more additional signals to alter timing of the charging window can include circuitry that monitors the minimum or valley voltage of the energy reservoir and increases or decreases the length of the timing window in response thereto. The circuitry that monitors the minimum or valley voltage of the energy reservoir and increases or decreases the length of the timing window in response thereto can include a hysteretic comparator.

The power system can further include circuitry responsive to one or more additional signals to modulate a setpoint of the maximum or peak voltage of the energy reservoir responsive to the maximum or peak voltage. The circuitry responsive to one or more additional signals to modulate a setpoint of the maximum or peak voltage of the energy reservoir responsive to the maximum or peak voltage can include a hysteretic comparator. The circuitry responsive to one or more additional signals to modulate a setpoint of the maximum or peak voltage of the energy reservoir responsive to the maximum or peak voltage can include a linear feedback shift register.

DETAILED DESCRIPTION

Figure 1:
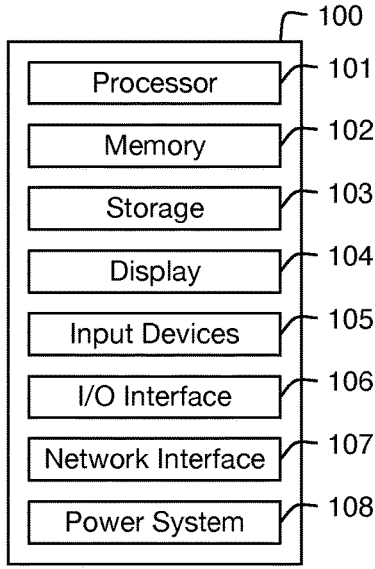
FIG. 1 illustrates a block diagram of an electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 is a block diagram of an electronic device 100, according to embodiments of the present disclosure. The electronic device 100 may include, among other things, one or more processors 101 (collectively referred to herein as a single processor for convenience, which may be implemented in any suitable form of processing circuitry), memory 102, nonvolatile storage 103, a display 104, input devices 105, an input/output (I/O) interface 106, a network interface 107, and a power system 108. The various functional blocks shown in FIG. 1 may include hardware elements (including circuitry), software elements (including machine-executable instructions), or a combination of both hardware and software elements (which may be referred to as logic). The processor 101, memory 102, the nonvolatile storage 103, the display 104, the input devices 105, the input/output (I/O) interface 106, the network interface 107, and/or the power system 108 may each be communicatively coupled directly or indirectly (e.g., through or via another component, a communication bus, a network, etc.) to one another to transmit and/or receive data amongst one another. It should be noted that FIG. 1 is merely one example of a particular implementation and is intended to illustrate the types of components that may be present in the electronic device 100.

By way of example, the electronic device 100 may include any suitable computing device, including a desktop or laptop/notebook, a portable electronic or handheld electronic device such as a wireless electronic device or smartphone, a tablet computer, a wearable electronic device, and other similar devices.

Processor 101 and other related items in FIG. 1 may be embodied wholly in hardware or by hardware programmed to execute suitable software instructions. Furthermore, the processor 101 and other related items in FIG. 1 may be a single contained processing module or may be incorporated wholly or partially within any of the other elements within the electronic device 100. Processor 101 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Processor 101 may include one or more application processors, one or more baseband processors, or both, and perform the various functions described herein.

In the electronic device 100 of FIG. 1, processor 101 may be operably coupled with a memory 102 and a nonvolatile storage 103 to perform various algorithms. Such programs or instructions executed by processor 101 may be stored in any suitable article of manufacture that includes one or more tangible, computer-readable media. The tangible, computer-readable media may include the memory 102 and/or the nonvolatile storage 103, individually or collectively, to store the instructions or routines. The memory 102 and the nonvolatile storage 103 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by processor 101 to enable the electronic device 100 to provide various functionalities.

In certain embodiments, the display 104 may facilitate users to view images generated on the electronic device 100. In some embodiments, the display 104 may include a touch screen, which may facilitate user interaction with a user interface of the electronic device 100. Furthermore, it should be appreciated that, in some embodiments, the display 104 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input devices 105 of the electronic device 100 may enable a user to interact with the electronic device 100 (e.g., pressing a button to increase or decrease a volume level). The I/O interface 106 may enable electronic device 100 to interface with various other electronic devices, as may the network interface 107. In some embodiments, the I/O interface 106 may include an I/O port for a hardwired connection for charging and/or content manipulation using a standard connector and protocol, such as a universal serial bus (USB), or other similar connector and protocol. The network interface 107 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 107 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 107 or the electronic device 100 may allow communication over the aforementioned networks (e.g., 5G, Wi-Fi, LTE-LAA, and so forth).

The network interface 107 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power system 108 of the electronic device 100 may include any suitable source of power, such as a rechargeable battery (e.g., a lithium ion or lithium polymer (Li-poly) battery) and/or a power converter, including a DC/DC power converter, an AC/DC power converter, a power adapter (which may be external), etc. Further aspects of power system 108 and its use in powering a pulsed load are described in greater detail below.

Figure 2:
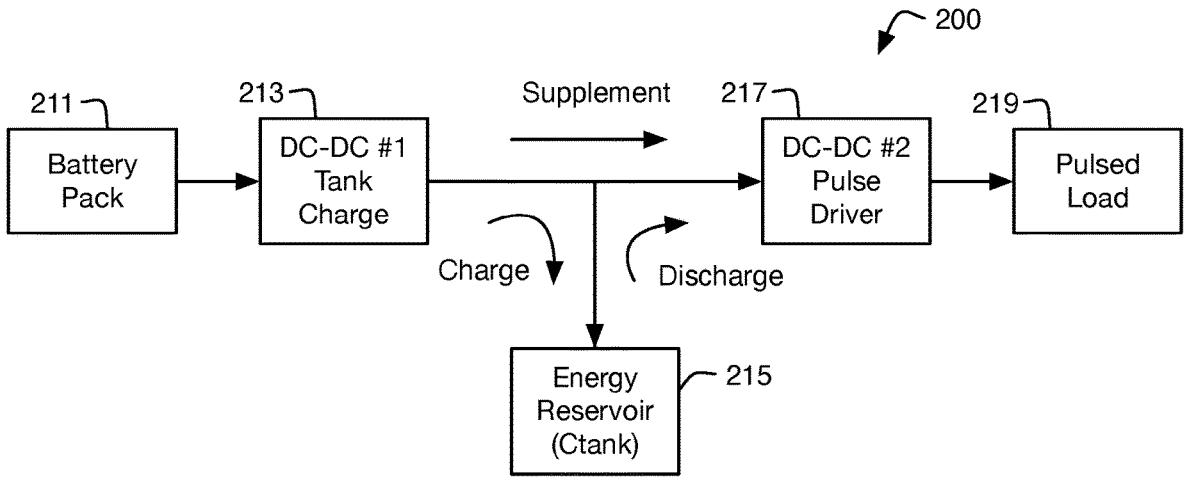
FIG. 2 illustrates a simplified block diagram of an electronic device power system supplying a pulsed load.

FIG. 2 illustrates a simplified block diagram of an electronic device power system 200 supplying a pulsed load 219. In this context, a pulsed load refers to any load that imposes an intermittent current or power requirement that is significant or substantial relative to the rating or capability of the power system. The intermittent current or power requirement may be periodic, meaning that it occurs at regular intervals, or it may be asynchronous, meaning that it occurs at irregular intervals. However, for purposes of the techniques discussed herein, it will be assumed that the timing of the load pulses is deterministic, meaning that the time of each pulse is known in advance of their occurrence. In some cases, this may be because of the periodic nature of the load pulses. In other cases, this may be because an advance signal indicating an impending load pulse is available. In the latter case, the advance signal may be provided ahead of a load pulse occurring at a predetermined time or may be a call for a load pulse that may be delayed until such time as the power system is ready for the pulse, as described in greater detail below.

Because the intermittent current or power requirement can be significant or substantial relative to the rating or capability of the power system, the power system may be designed to accommodate this transient power requirement.

For example, electrical system 200 may be powered by a battery pack 211. Battery pack 211 can store enough energy to operate the electronic device of which power system 200 is a part but may not be able to supply relatively high currents without experiencing an undesirable voltage drop. To mitigate this, an energy reservoir 215 (e.g., a tank capacitor Ctank) can be provided to temporarily store energy required to drive pulsed load 219. A first DC-DC converter 213 can be used to charge the energy storage reservoir as well as to supply the pulsed load (and other components of the electronic device). A second DC-DC converter 217 can be used as the pulse driver, i.e., the device that supplies power to the pulsed load 219. The energy reservoir 215 can be coupled to both the output of first DC-DC converter 213 and the input of the second DC-DC converter 217. First DC-DC converter 213 can thus charge the energy storage reservoir 215, and second DC-DC converter 217 can discharge energy reservoir 215 to provide power sufficient power to drive pulsed load 219. When second DC-DC converter 217 is operating to power pulsed load 219, DC-DC converter 213 can also supplement the energy stored in energy reservoir 215 to provide additional power for pulsed load 219. Further details of such operations are described in greater detail below.

The first and second DC-DC converters can have any of a variety of topologies, depending on the particulars of a given implementation. Such topologies can include buck converters, boost converters, buck-boost converters, flyback converters, forward converters, charge pumps, etc. In an embodiment described below the first DC-DC converter is a boost converter, and the second DC-DC converter is a buck converter. Such a configuration may be advantageous for at least some embodiments because increased voltage can allow for more energy to be stored in a capacitor of a given capacitance and/or the same amount of energy to be stored in a smaller capacitor. (As is known to those skilled in the art, the energy stored in a capacitor is proportional to the capacitance and to the square of the voltage). Although a boost-in, buck-out topology is described below, the principles described herein may be equally applicable to electrical systems implementing other converter topologies. Also, there is no reason that different converter topologies must be used for the respective converters, as the teachings herein can also be applied to cases in which the same topology is used for both converters. Additionally, although the present application describes examples with a single pulsed load driven by a single converter, there may be multiple pulsed loads driven by a single converter and/or multiple converters each driving one or more pulsed loads.

Figure 3:
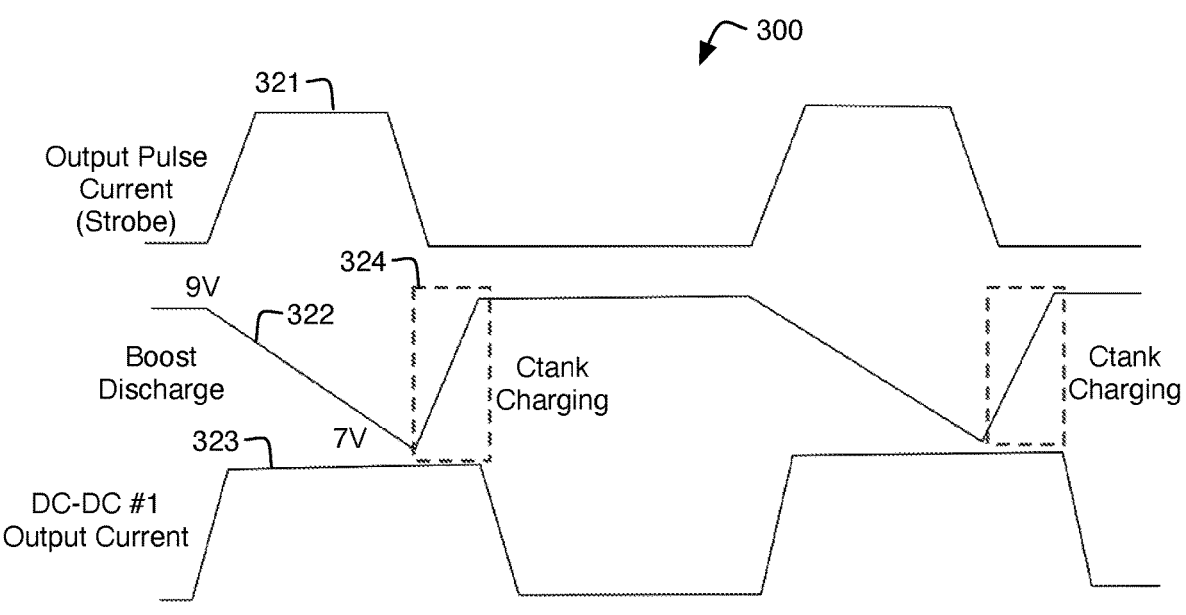
FIG. 3 illustrates a technique for charging and discharging an energy storage reservoir in connection with operation of a pulsed load.

FIG. 3 illustrates a technique for charging and discharging an energy storage reservoir in connection with operation of a pulsed load in the form of a plot 300 showing an output pulse current 321 (i.e., an output current of DC-DC converter 217) an energy reservoir voltage 322, and an output current 323 for first DC-DC converter 213. Beginning with output pulse current 321, also described herein as a "strobe," the current is initially at zero, and increases relatively quickly to a peak value, then decaying back to zero at the end of the pulse. Correspondingly, the energy reservoir voltage 322 begins at a peak value (e.g., 9V), then begins decreasing in conjunction with the rise in output pulse current 321. The energy reservoir voltage decreases to its minimum value (e.g., 7V) until the end of the output current pulse. Once the output current pulse ends, the energy reservoir voltage 322 begins increasing (during charging window 324) because of the output current of first DC-DC converter 213 (described in greater detail below with reference to curve 323). Once the energy reservoir voltage 322 again reaches its peak value (e.g., 9V), charging can stop until the next pulse occurs. The given values of energy reservoir peak voltage (9V) and energy reservoir valley voltage (7V) are merely exemplary values to provide context herein. Other peak voltage values and valley voltage values may be used depending on the design and requirements of a given implementation.

Turning to first DC-DC converter output current 323, the current can begin at some lower value, which may not be zero depending on instantaneous power demands of other system components. Once the output pulse current 321 begins, first DC-DC converter output current 323 may begin ramping up, reaching a peak value over a time period determined by the circuit parameters of the converter and its control circuitry. First DC-DC converter output current may remain at this peak value until after the output current pulse has ended and after the energy storage reservoir voltage 322 has recovered to its peak value at the end charging window 324. Charging window 324 can begin when the output current pulse ends, or, more precisely, when the output pulse current decreases below the peak current available from the first DC-DC converter 217. This allows at least a portion of the first DC-DC converter output current 323 to be used to charge energy reservoir 315 (thereby increasing energy reservoir voltage 322, as illustrated). Charging window 324 can end when the energy storage reservoir voltage 322 has recovered to its peak value.

The above-described sequence of operation can be broken down into two time periods: an active time period during which the output current pulse is being delivered, and an idle period during which the output pulse current is zero. In the above-described sequence, the first DC-DC converter 213 is active beginning more or less at the beginning of the active period, extending throughout the active period, and continuing after the active period (i.e., into the idle period) until the energy reservoir voltage 322 has recovered to its peak value. However, this need not be the case, and in some cases may be sub-optimal.

Figure 4:
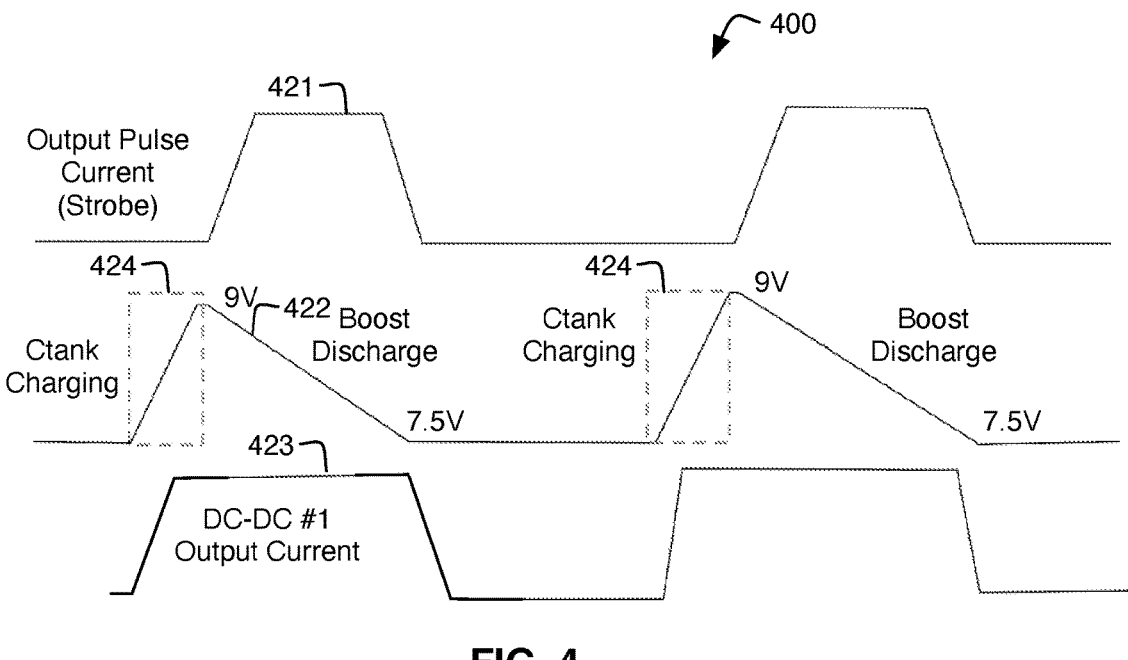
FIG. 4 illustrates an alternative, improved technique for charging and discharging an energy storage reservoir in connection with operation of a pulsed load.

FIG. 4 illustrates an alternative, improved technique for charging and discharging an energy storage reservoir in connection with operation of a pulsed load in the form of a plot 400 showing an output pulse current 421 (i.e., an output current of DC-DC converter 217) an energy reservoir voltage 422, and an output current 423 for first DC-DC converter 413. Beginning with output pulse current 421, also described herein as a "strobe," the current is initially at zero, and increases relatively quickly to a peak value, then decaying back to zero at the end of the pulse. Correspondingly, the energy reservoir voltage 422 begins at a peak value (e.g., 9V), then begins decreasing in conjunction with the rise in output pulse current 321. The energy reservoir voltage decreases to its minimum value (e.g., 7.5V) until the end of the output current pulse. Unlike the example described above with respect to FIG. 3, once the output current pulse ends, the energy reservoir voltage 422 remains constant until the beginning of the next charging window 424. Prior to a current pulse, a charging window 424 can begin, charging the energy reservoir voltage from its minimum value (e.g., 7.5V) to its maximum value (e.g., 9V). This charging window occurs prior to the output current pulse/strobe, allowing for (1) the energy reservoir to be charged to its full voltage before the output current pulse, and (2) first DC-DC converter 213 to be operating at or near its peak current when the output current pulse begins. The given values of energy reservoir peak voltage (9V) and energy reservoir valley voltage (7.5V) are merely exemplary values to provide context herein. Other peak voltage values and valley voltage values may be used depending on the design and requirements of a given implementation.

Turning to first DC-DC converter output current 423, the current can begin at some lower value, which may not be zero depending on instantaneous power demands of other system components. Once charging window 424 begins, first DC-DC converter output current 423 may begin ramping up, reaching a peak value over a time period determined by the circuit parameters of the converter and its control circuitry. First DC-DC converter output current may remain at this peak value until the output current pulse ends, leaving the energy storage reservoir voltage 422 has at its valley value at the end of the output current pulse. As noted above, charging window 324 can begin a sufficient time period before the output current pulses for the energy reservoir voltage 422 to charge to its peak value, with the charging window ending at or near the beginning of the output current pulse (as described in greater detail below).

The sequence of operation described with respect to FIG. 4 can be broken down into two time periods: an active time period during which the output current pulse is being delivered, and an idle period during which the output pulse current is zero. Unlike the sequence described with reference to FIG. 3, in the sequence of FIG. 4, the first DC-DC converter 213 is active prior to the beginning of the active period, having reached its peak current at or near the beginning of the active period. DC-DC converter 213 continues operating through the current pulse, returning to idle at approximately the beginning of the idle period.

In at least some applications, the sequence of FIG. 4 can provide one or more advantages over the sequence of FIG. 3. For example, the latter sequence can reduce the amount that the energy reservoir discharges in response to pulses. This can be because the first DC-DC converter 213 can already be operating at or near its peak current when the current pulse begins, thus reducing the amount of energy that must be drawn from the energy reservoir 2125 before the first DC-DC converter 213 ramps up to full output. In other words, charging energy reservoir 215 ahead of the current pulse/strobe and ensuring that first DC-DC converter 213 is at or near its rated current at or near the beginning of the strobe can reduce the amount of energy that must be stored in energy reservoir 215. This in turn can allow for various combinations of reduced size of energy reservoir 215 (in terms of capacitance, voltage, etc.), reduced operating ripple voltage, reduced average operating voltage, reduced acoustic noise from vibration of such capacitors due to reduction of ripple, etc. To achieve one or more of these and other potential advantages, control of the charging window and, more specifically, intelligent control of the first DC-DC converter 213 to achieve the desired charging window can be implemented using one or more of the techniques described in greater detail below.

Figure 5:
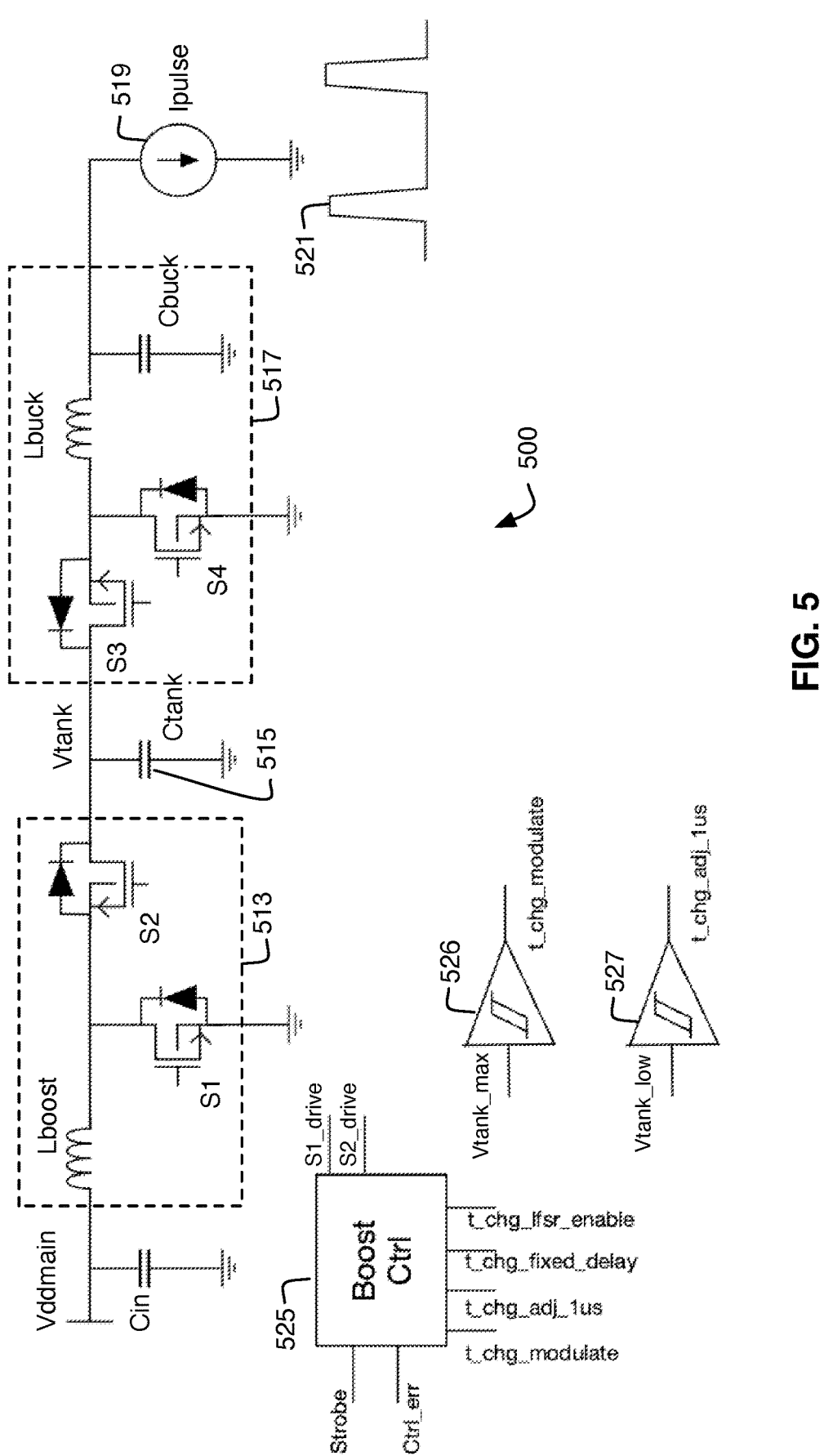
FIG. 5 illustrates a schematic diagram of an electronic device power system supplying a pulsed load implementing the improved technique described above.

FIG. 5 illustrates a schematic diagram 500 of an electronic device power system supplying a pulsed load implementing the improved technique described above. A DC power source (not shown in FIG. 5) can provide a voltage rail Vddmain supported by an input capacitor Cin. This input power rail can be coupled to the input of a first DC-DC converter, which is illustrated as a boost converter 513, although other converter types may be used as described above. Boost converter 513 can include a boost inductor Lboost, a boost switch S1, and a synchronous rectifier switch S2. In some embodiments, synchronous rectifier switch S2 may be replaced with a diode. Switches S1, S2 are depicted as field effect transistors (FETs)—more specifically metal oxide semiconductor field effect transistors (MOS-FETs), but other types of switching devices could be used if appropriate for a given application. The switching devices can be implemented using any suitable semiconductor technology, such as silicon (Si), silicon-carbide (SiC), gallium nitride (GaN), etc. The switches S1, S2 may be discrete devices or may be integrated devices, which can be formed on the same substrate as boost control circuitry 525, discussed in greater detail below.

Boost converter 513 can supply power to an energy reservoir 515 in the form of a tank capacitor Ctank. Energy stored in tank capacitor Ctank produces a voltage Vtank appearing at the output of boost converter 513 and at the input of a second DC-DC converter, illustrated as buck converter 517. Although illustrated as buck converter 517, the second DC-DC converter can be implemented as another converter topology, as described above. Buck converter 517 can include buck switches S3, S4, a buck inductor Lbuck, and an output capacitor Cbuck. Buck converter 517 can take as an input the output of boost converter 513/the tank capacitor voltage Vtank and produce a voltage and/or current suitable for driving pulsed load 519 with a series of pulses 521, as was described above. As with boost converter switches S1, S2, the buck converter switches S3, S4 can be implemented using any suitable switching device type (including replacing switch S3 with a diode) formed from any suitable semiconductor technology as either discrete or integrated devices. Buck converter control circuitry (not shown) can cause the devices to produce the desired pulses for pulsed load 519 according to the requirements of such pulsed load.

Boost converter 513 can be controlled by boost control circuitry 525. Boost control circuitry 525 can implement a variety of control techniques and algorithms according to the requirements of a given application. Boost control circuitry 525 can be implemented using any appropriate combination of analog control circuitry (including analog control loops, error amplifiers, etc.), digital control circuitry (including discrete or integrated logic gates, flip flops, etc.), and/or programmable control circuitry (including microcontrollers, microprocessors, programmable logic devices, field programmable gate arrays, etc.). Boost control circuitry can be integrated into a single application specific integrated circuit (ASIC) or can be formed from various integrated and discrete circuits performing various functions. Boost control circuitry can implement discontinuous conduction mode (DCM), critical conduction mode (CrCM), or continuous conduction mode (CCM) control strategies during its active period. Such control strategies can also include pulse frequency modulation and/or burst mode operation to accommodate the idle periods of boost converter 513. Boost control circuitry may implement one or more control loops, such as a control loop that regulates the output voltage Vtank and/or the output current supplied to tank capacitor 515 and/or buck converter 517. In one embodiment, boost control circuitry 525 can implement a peak current control strategy generates drive signals S1_drive and S2_drive for the corresponding boost converter switches to produce the desired output.

More specifically, boost control circuitry 525 can receive as inputs a Strobe signal, indicating the timing with which an output current pulse of buck converter 517/pulsed load 519 will occur, and a control error signal Ctrl_err, which can be a feedback signal of the regulated output voltage and/or current. Boost control circuitry 525 can implement one or more analog or digital control loops to generate the required drive signals S1_drive, S2_drive to achieve the desired output, as described above. Boost control circuitry can also receive one or more additional control signals that can modify the operation of boost control circuitry to achieve a desired output. Such signals can include one or more of: (1) t_chg_modulate, which can modulate the length of the charging window, (2) tchg_adj_1us, which can incrementally increase the length of the charging winnow, (3) t_chg_fixed_delay, which can set a length of the charging window, and t_chg_lfsr_enable, which can "dither" the length/endpoint of the charging window to provide improved operation. Aspects of these signals are further described below with reference to FIG. 6. Implementation of such dithering can be done relatively easily and may potentially improve the spread of the physical vibration of the Ctank capacitor and acoustic noise issues associated with large ripple impressed during charging and discharging cycle.

Figure 6:
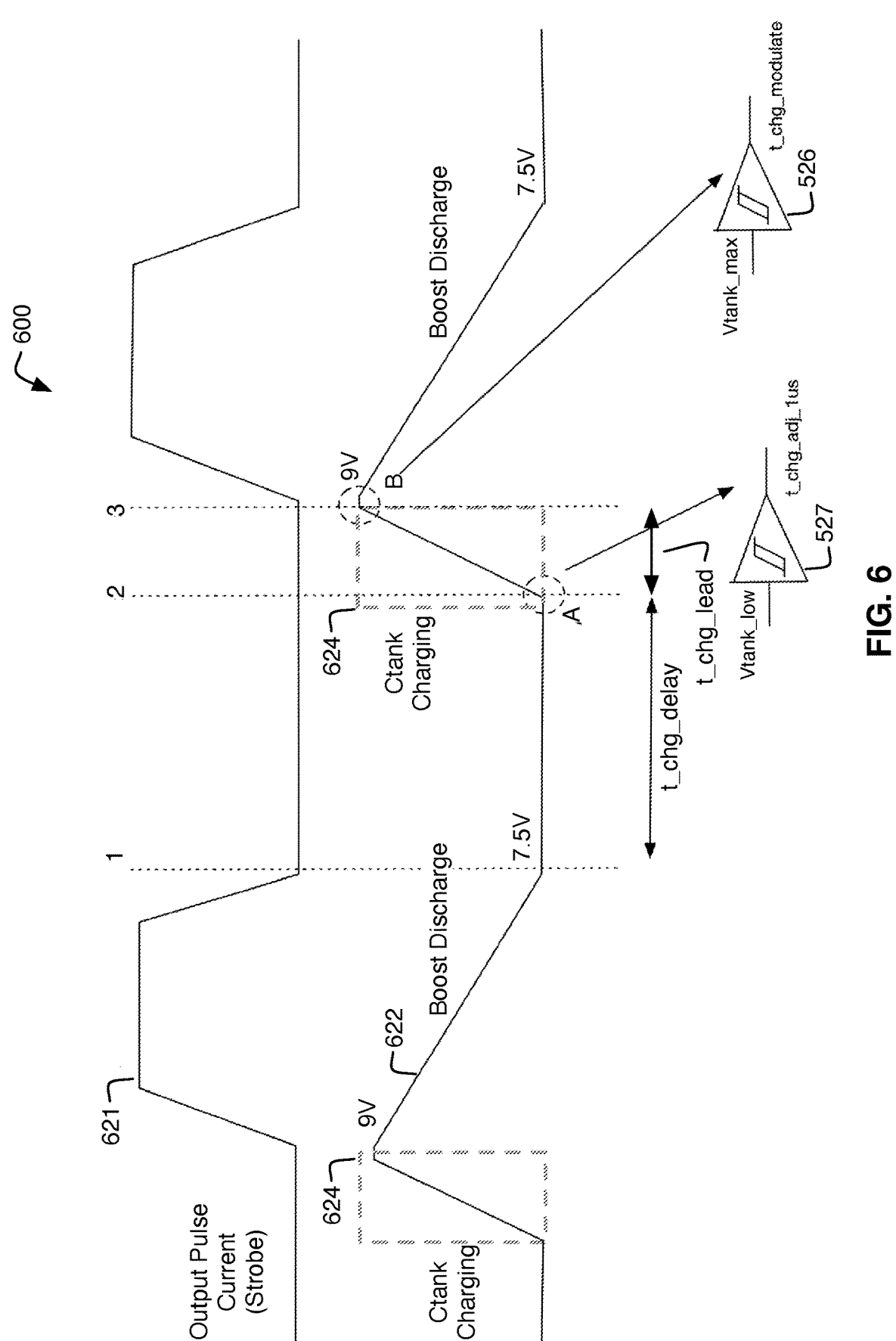
FIG. 6 further illustrates aspects of an electronic device power system supplying a pulsed load implementing the improved technique described above.

FIG. 6 further illustrates aspects of an electronic device power system supplying a pulsed load implementing the improved technique described above. More specifically, FIG. 6 depicts a plot 600, illustrating an output pulse current (strobe) waveform 621 and a corresponding tank capacitor voltage waveform 622 that are similar to those described above with respect to FIG. 4. Output pulse current waveform 621 exhibits two output current pulses (strobes) including a first one ending at time 1 and a second one beginning at time 3. As an example, prior to the first output current pulse (strobe) the tank capacitor voltage 622 increases during a charging window 624. For example, during this window, boost converter 513 can be operated by boost control circuitry 525 to charge the tank capacitor Ctank from its minimum/valley voltage (e.g., 7.5V) to its maximum/peak voltage (e.g., 9V). (These voltage values are merely contextual examples, and any suitable minimum/valley voltage and maximum/peak voltage can be used.) One the output current pulse (strobe) begins, boost converter 513 can continue providing its maximum output current, even as the output current pulse (strobe) consumes this current as well as energy stored in tank capacitor Ctank, thereby decreasing its voltage back to the minimum/valley value (e.g., 7.5V).

Thus, at time 1, the first output current pulse (strobe) has just completed, the tank capacitor Ctank has discharged to its minimum/valley voltage level, and boost converter 513 is idle. This commences a delay period denoted in FIG. 6 as t_chg_delay. The t_chg_delay period can be determined by boost control circuitry 525 with reference to the t_chg_fixed_delay signal illustrated in FIG. 5, plus or minus any adjustments as described below. Upon expiration of the t_chg_delay delay period, a subsequent charging window 624 can begin ahead of the second output current pulse (strobe), which itself begins at time 3. This allows the cycle described above with respect to the first output current pulse (strobe) to be repeated. As an alternative to a delay period following a preceding pulse, the charging window may be controlled to start at a lead time T_chg_lead ahead of a following pulse. In either case, boost control circuitry 525 can determine the appropriate timing with respect to the received Strobe and t_chg_*** signals described above. The specific configuration of the respective signals can vary depending on implementation, but the underlying logic can be generally the same.

As described above, the t_chg_fixed_delay (or alternatively t_chg_fixed_lead) can be a baseline value for the delay/lead period depicted in FIG. 6. Such baseline value can be determined based on nominal parameters of the system, which can vary from implementation to the next, but can be determined and stored or pre-configured into the system at manufacture. As illustrated at region A in FIG. 6, the control circuitry can monitor the minimum/valley voltage reached just prior to the beginning of the charging window 624. If the minimum/valley voltage has reached a level lower than anticipated, then the t_chg_adj_1us signal can be used to slightly decrease t_chg_delay interval (or slilghtly increase the t_chg_lead interval) to ensure that the tank capacitor voltage and/or boost converter output current reach their maximum value just prior to the beginning of the next output current pulse (strobe). One way this can be achieved is providing the Vtank_low voltage signal to a hysteretic comparator 527, which can compare this value to a reference voltage (not shown) and trigger adjustment as required. Other techniques for achieving the same result using different circuitry are also possible.

Additionally or alternatively, rather than decreasing the delay period t_chg_delay or increasing the lead period t_chg_lead in response to the minimum/valley value of Vtank falling below a reference value, boost control circuitry 525 could do the opposite. In other words, control circuitry 525 could increase the delay period t_chg_delay or decrease the lead period t_chg_lead in response to the minimum/valley value of Vtank not falling to the reference value. Such functionality could be implemented using generally similar circuitry and/or logic constructs. Also, the 1us in the named signal can refer to an amount by which the baseline delay or lead is adjusted, e.g., one microsecond. However, this value can also vary depending on the requirements of any given implementation and can be either longer or shorter as appropriate. Moreover, in at least some embodiments different increments can be employed depending on the degree by which the minimum/valley of Vtank falls below or fails to reach the desired reference value.

Charging window adjustments can also occur based on occurrences at the end of the charging window, i.e., region B in FIG. 6. Boost controller circuitry 525 can monitor the maximum/peak value of the tank capacitor voltage Vtank and alter the delay or lead period accordingly. In some embodiments, the maximum/peak of voltage Vtank_max can be monitored by a hysteretic comparator 526 and compared to a reference voltage (not shown). The output of hysteretic comparator 526 (or circuitry implementing similar functionality) can be used to ensure that the output current of boost converter 513 has reached its maximum output current, the t_chg_modulate signal (i.e., the output of hysteretic comparator 526) can be used to cause the max voltage setpoint to chatter or dither around its nominal value (e.g., 9V). This functionality can be implemented using a linear feedback shift register (LFSR) as part of boost control circuitry 525 that can be selectively enabled or disabled by the t_chg_lfsr_enable signal also provided to boost control circuitry 525 as illustrated in FIG. 5. Additionally, in at least some embodiments, control circuitry 525 can be configured so during the output current pulse (strobe) the boost converter 513 operates at open loop maximum output to ensure that as much current as possible from the input source reaches the tank capacitor Ctank and/or buck converter 517.

The foregoing describes exemplary embodiments of power systems for powering pulsed loads. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An electronic device power system that powers a pulsed load that intermittently delivers current pulses, the power system comprising:
    a tank capacitor for storing energy to deliver the current pulses of the pulsed load;
    a boost converter having an input that receives an input voltage and an output coupled to the tank capacitor;
    an additional converter having an input coupled to the tank capacitor and an output couplable to the pulsed load; and
    control circuitry that operates the boost converter to charge the tank capacitor from a minimum or valley voltage to a maximum or peak voltage during a charging window just prior to a current pulse of the pulsed load so that the boost converter is at or near its maximum output current at a beginning of the current pulse of the pulsed load, the control circuitry comprising:
        circuitry responsive to a strobe signal indicating a timing of the current pulse and a control error signal to generate drive signals for one or more switching devices of the boost converter;
        circuitry responsive to one or more additional signals to alter timing of the charging window; and
        circuitry responsive to one or more additional signals to modulate a setpoint of the maximum or peak voltage of the tank capacitor responsive to the maximum or peak voltage.

2. The electronic device power system of claim 1 wherein the circuitry responsive to one or more additional signals to alter timing of the charging window includes circuitry that monitors the minimum or valley voltage of the tank capacitor and increases or decreases the length of the charging window in response thereto.

3. The electronic device power system of claim 2 wherein the circuitry that monitors the minimum or valley voltage of the tank capacitor and increases or decreases the length of the charging window in response thereto includes a hysteretic comparator.

4. The electronic device power system of claim 1 wherein the circuitry responsive to one or more additional signals to modulate a setpoint of the maximum or peak voltage of the tank capacitor responsive to the maximum or peak voltage includes a hysteretic comparator.

5. The electronic device power system of claim 1 wherein the circuitry responsive to one or more additional signals to modulate a setpoint of the maximum or peak voltage of the tank capacitor responsive to the maximum or peak voltage includes a linear feedback shift register.

6. A controller for a power system that powers a pulsed load that intermittently delivers current pulses, the controller comprising control circuitry configured to operate a DC-DC converter to charge an energy reservoir from a minimum or valley voltage to a maximum or peak voltage during a charging window just prior to a current pulse of the pulsed load so that the DC-DC converter is at or near its maximum output current at a beginning of the current pulse of the pulsed load, wherein the control circuitry comprises circuitry responsive to a strobe signal indicating a timing of the current pulse and a control error signal to generate drive signals for one or more switching devices of the DC-DC converter.

7. The controller of claim 6 wherein the energy reservoir is a tank capacitor, and the DC-DC converter is a boost converter.

8. The controller of claim 6 further comprising circuitry responsive to one or more additional signals to alter timing of the charging window.

9. The controller of claim 8 wherein the circuitry responsive to one or more additional signals to alter timing of the charging window includes circuitry that monitors the minimum or valley voltage of the energy reservoir and increases or decreases the length of the charging window in response thereto.

10. The controller of claim 8 further comprising circuitry responsive to one or more additional signals to modulate a setpoint of the maximum or peak voltage of the energy reservoir responsive to the maximum or peak voltage.

11. A power system for powering a pulsed load that intermittently delivers current pulses, the power system comprising:
an energy reservoir;
a first DC-DC converter having an input that receives an input voltage and an output coupled to the energy reservoir;
a second DC-DC converter having an input coupled to the energy reservoir and an output couplable to the pulsed load; and
control circuitry that operates the first DC-DC converter to charge the energy reservoir from a minimum or valley voltage to a maximum or peak voltage during a charging window just prior to a current pulse of the pulsed load so that the first DC-DC converter is at or near its maximum output current at a beginning of the current pulse of the pulsed load.

12. The power system of claim 11 wherein the energy reservoir is a tank capacitor, the first DC-DC converter is a boost converter, and the second DC-DC converter is a buck converter.

13. The power system of claim 11 wherein the control circuitry comprises circuitry responsive to a strobe signal indicating a timing of the current pulse and a control error signal to generate drive signals for one or more switching devices of the first DC-DC converter.

14. The power system of claim 13 further comprising circuitry responsive to one or more additional signals to alter timing of the charging window.

15. The power system of claim 14 wherein the circuitry responsive to one or more additional signals to alter timing of the charging window includes circuitry that monitors the minimum or valley voltage of the energy reservoir and increases or decreases the length of the charging window in response thereto.

16. The power system of claim 14 wherein the circuitry that monitors the minimum or valley voltage of the energy reservoir and increases or decreases the length of the charging window in response thereto includes a hysteretic comparator.

17. The power system of claim 13 further comprising circuitry responsive to one or more additional signals to modulate a setpoint of the maximum or peak voltage of the energy reservoir responsive to the maximum or peak voltage.

18. The power system of claim 17 wherein the circuitry responsive to one or more additional signals to modulate a setpoint of the maximum or peak voltage of the energy reservoir responsive to the maximum or peak voltage includes a hysteretic comparator.

19. The power system of claim 18 wherein the circuitry responsive to one or more additional signals to modulate a setpoint of the maximum or peak voltage of the energy reservoir responsive to the maximum or peak voltage includes a linear feedback shift register.

20. The power system of claim 17 wherein the circuitry responsive to one or more additional signals to modulate a setpoint of the maximum or peak voltage of the energy reservoir responsive to the maximum or peak voltage includes a linear feedback shift register.

* * * * *